Feb. 4, 1936. F. FISCHER ET AL 2,029,614
APPARATUS FOR TAKING OR PROJECTING LENTICULATED FILMS
Filed Feb. 24, 1933 2 Sheets-Sheet 1
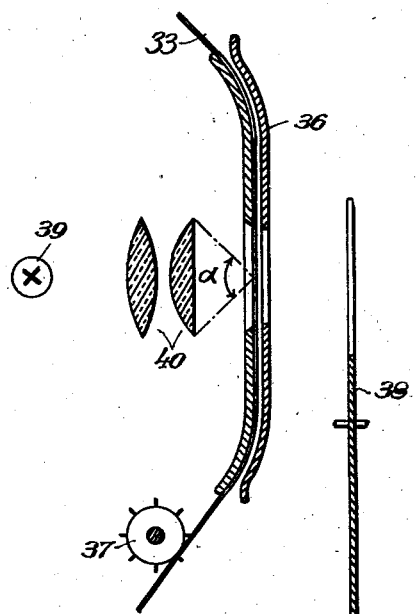
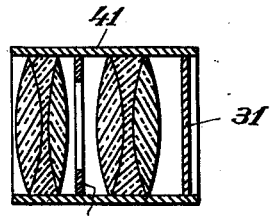
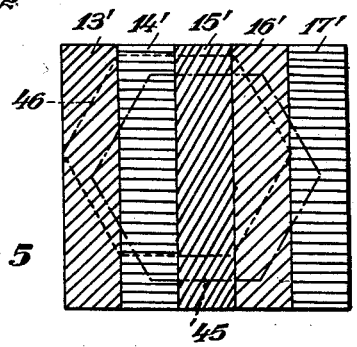
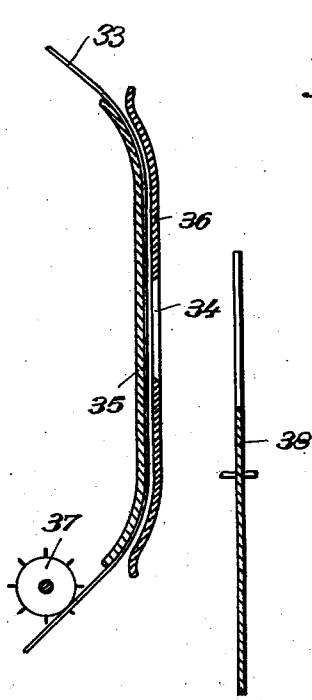
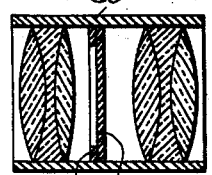

Feb. 4, 1936.  F. FISCHER ET AL  2,029,614
APPARATUS FOR TAKING OR PROJECTING LENTICULATED FILMS
Filed Feb. 24, 1933  2 Sheets-Sheet 2
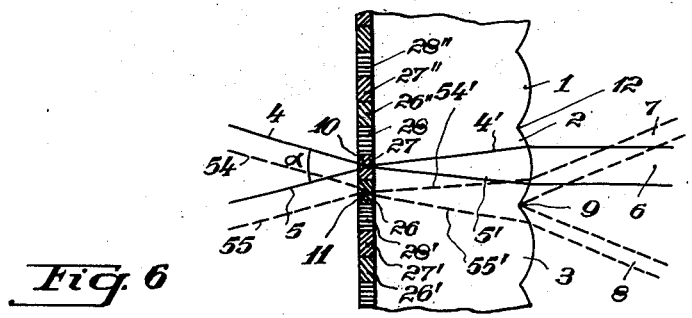
Fig. 6
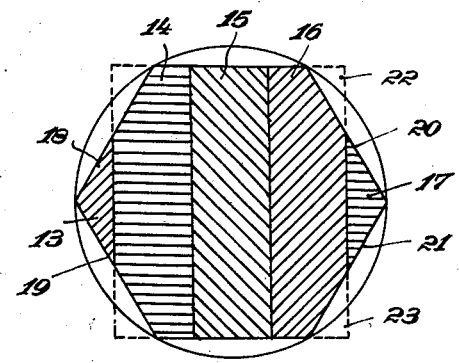
Fig. 4
Fig. 7
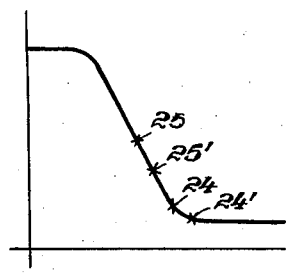
Fritz Fischer
Felix Strecher
Hans Neugebauer
Inventors.
By Gifford, Scull & Burgess
Attorneys.

Patented Feb. 4, 1936

2,029,614

UNITED STATES PATENT OFFICE 2,029,614

APPARATUS FOR TAKING OR PROJECTING LENTICULATED FILMS

Fritz Fischer, Berlin-Charlottenburg, Felix Strecker, Berlin-Siemensstadt, and Hans Neugebauer, Berlin-Lichterfelde, Germany, assignors to Siemens & Halske, Aktiengesellschaft, Siemensstadt, near Berlin, Germany, a corporation of Germany Application February 24, 1933, Serial No. 658,328
In Germany February 25, 1932

8 Claims. (Cl. 88—16.4)

This invention relates to apparatus for taking and projecting coloured pictures on lenticulated films. These films carry a large number of embossed lenticular elements either of spherical or cylindrical shape opposite to the photographic layer.

A first object of this invention is that there should appear a pure white without any colouration when a lenticulated blank-film (i. e. a lenticulated film deprived of the photographic layer) is projected on a white screen by means of the projection apparatus containing the polychromatic filter.

Other objects of the invention will be seen by the following description, which will also explain the advantages gained by the invention.

In the accompanying drawings:

Fig. 1 shows a sectional view of a taking apparatus.

Fig. 2 shows a sectional view of a projection apparatus.

Figs. 3 to 5 show some multicolour filters which are used in combination with said apparatus.

Fig. 6 shows a sectional view of a lenticulated film and some of the rays of light passing it.

Fig. 7 serves for explaining one of the advantages gained by the invention.

In Fig. 1, 30 is an objective of a taking apparatus, containing a multicolour filter 31. A diaphragm 32 may be placed close to the filter. The lenticulated film 33 passes the film-gate 34, formed by the members 35 and 36. The film is driven by the roller 37, and a shutter 38 closes the objective, when the film is moved onward.

In Fig. 2 the film 33 is illuminated when passing the film-gate by a lamp 39 and a condenser 40. The film-gate, the driving element, and the shutter may be constructed as in Fig. 1. These parts as well as the lighting system are well-known in the art for themselves and are only shown as examples.

The objective 41 contains a diaphragm 32, the multicolour filter 31 being placed in front of the objective. From the following explanations it will be seen, that there is also the possibility of using an objective of the type shown in Fig. 1 in combination with an apparatus for projecting and an objective of the type shown in Fig. 2 in combination with an apparatus for taking views.

The light-filter 31 may be formed of three differently coloured zones 42, 43 and 44, whose sum gives substantially the sensation of white light, as is well known in the art. If there is used a film with cylindrically shaped lenticular elements or gofferations, the edges between the zones of the filter are placed parallel to the cylindrical elements of the film. When a view is taken, each lens of the film photographs the filter on to the photographic layer or emulsion as is shown in detail in Fig. 6.

The zones 26, 27 and 28 of the emulsion or photographic layer 29 are the images of the three filter-zones 42, 43 and 44 respectively. They are formed by the lens 2 forming part of the film. In the same way the images 26', 27' and 28' behind lens 3 of the film and 26", 27" and 28" behind lens 1 of the film correspond to the zones 42, 43 and 44 respectively. When the film is projected, light-beams pass through the photographic layer and are directed by the lenses of the film to the respective filter-zones.

The colour which may be seen, when a goffered or lenticulated blank-film is projected by the apparatus, shown in Fig. 2, on to a white screen, is a function of the colour of the lamp 39, of the angle α defining the aperture of the objective and formed by the rays 4 and 5 (Fig. 6), and of the shapes and transparencies of the filter-zones 42, 43 and 44. These elements are so chosen, that a pure white may be seen on the screen. If on the other hand a non-lenticulated blank-film is projected by the same apparatus, there appears a colouration in which generally the colours of the marginal zones are predominant.

From the aforesaid it follows, that the three zones 26, 27 and 28 must be of equal density, if a colourless object, that is a gray or white one, is to be projected.

Thus one object of the invention is a lenticulated film, in which the densities of the different zones behind a film-lens at a spot corresponding to a colourless object are equal.

An advantage of such projection apparatus and films is, that more brilliant images may be projected. For, the white spots of an image being the lightest ones, it would be wasting light, if a part of the photographic layer, corresponding to a very light white object, should not be quite clear.

The filters used in the taking-apparatus are related to the filters of the projection-apparatus by the condition that all colours are rendered as exactly as possible, so that the changes of hue and of deepness of colour, which can never be completely avoided, may be as small as possible. The width and succession of colors of the taking filters being determined by the projection-filters, the heights and transparencies of the zones may still be chosen, so that the colours are rendered best. A condition that is fulfilled according to our invention is that the transparencies of the zones and the sensibility of the photographic emulsion of the taking film are such that the image of a colourless object is formed by zones 26, 27 and 28 of equal densities. Thus a very light object will be represented on tne negative by zones of equal density, while gray objects are reproduced by zones which are of smaller density, but also of equal density with respect to each other.

From this fact results a very important advantage: The light departing from a photographed object is divided by the colour-filter into three components, which are generally red, green and blue. At all events white is composed by these three components. The brightness of each of said components is registered on the film. In order to simplify the explanation, it may be assumed that the H and D-curves of the photographic emulsions for all three colours are the same. Such a curve is drawn in Fig. 7. The abscisses are the logarithms of exposures and the ordinates are the densities.

At first we shall consider the case, that the image of a colourless object is formed by zones of different densities. If then the object is not too light, the density corresponding to one zone of the filter may be represented by point 24 and the density corresponding to another zone of the filter by point 25. But if the white object is more light the respective densities are represented by the points 24' and 25'.

Fig. 7 shows that the densities represented by the points 24 and 24' are changing much more slowly in that part of the H- and D-curve than the corresponding densities represented by the points 25 and 25'. Thus all bright objects will be reproduced with false colours if the dark colours are reproduced correctly. All gray objects are reproduced gray, but all white objects are reproduced as coloured ones. Such false colours are most disturbing with light objects and especially if these objects are white ones.

As according to the invention a colourless object gives rise to three zones of equal density on the film, the very disturbing faults of colour-rendering described above are avoided. This results from the fact, that the points 24 and 25 as well as the points 24' and 25' are the same.

If the filter is circular shaped as in Fig. 3, the intensity of light falling on the film is not the same for the different points of one zone. The strip 26 of Fig. 6 is e. g. an image of the filter-zone 42 of Fig. 3. As that zone is of smaller height at the outer side than it is at the side near zone 43, the density of zone 26 is not the same at all points in its area. In order to maintain the condition of equal density for all zones, one has to consider the average density of such a zone. But it is better to use only rectangularly shaped filter-zones.

Then the whole filter may be formed as a rectangle, all zones having the same height. In this case the three zones are equally exposed if a colourless object is photographed which is of interest, when a panchromatic emulsion is used.

Rectangular filter-zones are also of importance if the filter 31 and the diaphragm 32 are distant from each other as shown in Fig. 2. The colors of the filter-zones are then periodically repeated, so that the lenticular elements lying at the side of the film send the light or get it through other filter-zones than the elements lying in the midst of the film.

There is still another application of rectangular filter-zones: In those apparatus with which the succession of colours is changed when the film is moved onward. The condition, that the zones, which are lying at the same place after each changing of the filter, must be of equal width, may only be fulfilled by the use of rectangular zones, especially if the equally coloured zones are formed by equal substances of equal thickness.

A drawback of rectangular filters is, that the circular objective opening is only partly used, so that there are great losses of light. These losses are diminished, when, in exposing the photographic layer behind one lenticular element, a part of the light passing through the neighbouring lenticular elements is also used. According to this invention the filter-zones are of such shape that, when views are taken, as well as when they are projected, the effect is the same as if rectangular zones shutting out the neighbouring lenticular elements were used. It is advantageous to choose also the colour-screens in the following way. At first the widths, heights and transparencies of the filter-zones are determined so that there appears a pure white on a white screen, when a lenticulated blank-film is projected by the use of a rectangular filter and without the use of neighbouring lenticular elements. Such a rectangular filter may be of greater area than the opening of the objective. Then oblique regions are cut off from the marginal zones, so that the filter no longer extends beyond the objective opening, and the oblique regions are used, to form new marginal zones, which are imaged by the neighbouring lenticular elements on the same strips on which the equally coloured inner zones are imaged by the lenticular element just before the said strips of the photographic layer.

In order to better explain the details, Figures 4 and 6 may be considered. The film 33 of Figure 6 has among others the lenticular elements 1, 2 and 3. We shall suppose that the film is to be projected, it being noted that there are similar conditions when views are taken. When light falls on the photographic layer, all the rays which pass through the point 10, in zone 27, lie in the cone formed by the rays 4 and 5. This light passes through the film as cone 4', 5' and is affected only by the lens 2, which is limited by the edges 9 and 12. By this lens the light-cone 4', 5' is so refracted, that the beam 6 of parallel rays leaves the film.

However, the bundle of light-rays passing through point 11 in the zone 26, and bounded by the cone 54, 55, passes through the film as cone 54', 55' and is affected partly by lens 2 and partly by lens 3. One part of this bundle is refracted by the lens 2 to form the beam 7 of parallel rays, while the other part is refracted by the lens 3 to form the beam 8 of parallel rays.

If now the filter shown in Fig. 3 is used, the beam 6 is directed to the zone 43, corresponding to the zone 27, and the beam 7 to the zone 42, corresponding to the zone 26. But the beam 8 hits the support of the objective and is thus lost for projection. This loss is the cause for the difference in colours which may be ob. ved when a smooth and a goffered blank-film are projected by the same apparatus of the prior art. In order to better profit by the light a filter as shown in Fig. 4 is used. It is composed of the five zones 13 to 17. The width of the three zones 14, 15, 16 is such that they are seen from the film by an angle, which is equal to the angular opening of the lens 2. Then the beam 7 passes through zone 14, and the beam 8 through zone 17. Now 13 has the same colour as 16 and 14 the same colour as 17, so that the beam 8 makes the picture more intense. The effect is similar when such filter is used for taking views. The condition is always to make the zones of such an area that pure white is seen when a goffered blank-film is projected.

Preferably the heights of the zones on the filter, at every spot are so chosen that they give a constant sum with the heights of those equally coloured zones, which correspond to the same spot of the photographic layer. For this purpose the filter represented in Fig. 4 has the form of a regular hexagon. The triangles 22 and 23 are as large as the triangle 13, as the marginal borders of the zones 14 and 15 pass through the centers of the sides 18, 19 and 20, 21 respectively. If therefore one adds to the height of zone 14 at any spot the height of zone 17 at the corresponding spot, the sum is equal to the height of zone 15.

The shape of the filter may also be different from that of a regular hexagon. It is also possible to alter the number of the filter-zones.

Filters of such width, that the neighbouring lenses are used, may also be used when the diaphragm is distant from the filter. This is seen from Fig. 5. The filter is formed by five zones 13' to 17', the zones 13' and 16' as well as 14' and 17' being of the same colour. This filter may be arranged as shown in Figure 2. The diaphragm 32, distant from the filter 31, has a hexagonal shape, so that from the center of the image on the film, that part of the filter is seen, which lies in the interior of the hexagon 45. From other points other parts are seen, e. g. that part in the interior of the hexagon 46.

It is possible to use the neighbouring lenses either with the taking-apparatus alone or with the projecting apparatus alone or even with the apparatus for reproduction. It may also be used with several of these apparatus. By these means it is possible to get rid of the condition, that the angular openings of the objectives must be the same in the three processes.

We claim as our invention:

1. In the combination of a lenticulated film and an objective adapted to transmit light passing through the lenticulations on the film, a color filter through which said light also passes, said filter having a plurality of zones of different colors whose sum gives substantially the sensation of white light, said filter also having outer zones, the color of an outer zone being substantially the same as that of the zone adjacent the opposite outer zone, the sum of the area of one of said outer zones and that of the zone adjacent to the opposite outer zone being substantially equal to the sum of the area of the opposite outer zone and the zone adjacent said one outer zone.

2. In combination, a lenticulated film, an objective adapted to transmit light passing through the lenticulations on the film and having an aperture greater than that of said lenticulations, and a color filter through which said light passes, said filter having three parallel zones of different colors whose sum gives substantially the sensation of white light and also having outer zones adjacent the side ones of said three zones, the sum of the areas of one outer zone and the opposite side zone being equal to the sum of the areas of the other outer zone and the other side zone.

3. In combination, a lenticulated film, an objective adapted to transmit light passing through the lenticulations on the film and having an aperture greater than that of said lenticulations, and a color filter through which said light passes, said filter having three parallel zones of different colors whose sum gives substantially the sensation of white light and also having outer zones adjacent the side ones of said three zones, the sum of the areas of one outer zone and the opposite side zone being equal to the sum of the areas of the other outer zone and the other side zone and equal to the area of the central one of the three zones.

4. In combination, a lenticulated film, an objective adapted to transmit light passing through the lenticulations on the film and having an aperture greater than that of said lenticulations, and a color filter through which said light passes, said filter having three parallel zones of different colors whose sum gives substantially the sensation of white light and also having outer zones adjacent the side ones of said three zones, the sum of the areas of one outer zone and the opposite side zone being equal to the area of the central one of the three zones.

5. In combination, a lenticulated film, an objective adapted to transmit light passing through the lenticulations on the film, and a color filter through which said light also passes and having a plurality of parallel zones the sum of whose colors gives substantially the sensation of white light, said zones together forming a generally rectangular-shaped figure with the corners thereof extending outside the circle defined by said objective and with corner portions of said figure removed to keep substantially within said circle, said filter also having outer zones parallel to said first-named zones and disposed within said circle and of substantially equal area to said removed corner portions, each outer zone being of a color substantially the same as that of the zone adjacent to the opposite outer zone.

6. In combination, a lenticulated film, an objective adapted to transmit light passing through the lenticulations on the film and having an aperture greater than that of said lenticulations, and a color filter through which said light also passes and having a plurality of parallel zones the sum of whose colors gives substantially the sensation of white light, said zones together forming a generally rectangular-shaped figure with the corners thereof extending outside the circle defined by said objective and with corner portions of said figure removed to keep substantially within said circle, said filter also having outer zones parallel to said first-named zones and disposed within said circle and of substantially equal area to said removed corner portions, each outer zone being of a color substantially the same as that of the zone adjacent to the opposite outer zone.

7. In combination, a lenticulated film, an objective adapted to transmit light passing through the lenticulations on the film, and a color filter through which said light also passes, said filter having a plurality of zones of different colors whose sum gives substantially the sensation of white light, said filter also having outer zones, the color of an outer zone being substantially the same as that of the zone adjacent the opposite outer zone, said filter forming a polygon inscribed within the circle defined by the aperture of the objective.

8. In combination, a lenticulated film, an objective adapted to transmit light passing through the lenticulations on the film, and a color filter through which said light also passes, said filter having a plurality of zones of different colors whose sum gives substantially the sensation of white light, said filter also having outer zones, the color of an outer zone being substantially the same as that of the zone adjacent the opposite outer zone, said filter forming a polygon inscribed within the circle defined by the aperture of the objective, and said aperture being greater than that of said lenticulations.

FRITZ FISCHER.
FELIX STRECKER.
HANS NEUGEBAUER.